US008516232B2

(12) United States Patent
Dolgunov et al.

(10) Patent No.: US 8,516,232 B2
(45) Date of Patent: Aug. 20, 2013

(54) METHOD AND MEMORY DEVICE FOR PERFORMING AN OPERATION ON DATA

(75) Inventors: Boris Dolgunov, Ramat-Gan (IL); Michael Holtzman, Kfar Vradim (IL); Ron Barzilai, Sunnyvale, CA (US); Eran Shen, Naharya (IL)

(73) Assignee: SanDisk Technologies Inc., Plano, TX (US)

( * ) Notice: Subject to any disclaimer, the term of this patent is extended or adjusted under 35 U.S.C. 154(b) by 830 days.

(21) Appl. No.: 12/495,302

(22) Filed: Jun. 30, 2009

(65) Prior Publication Data

US 2010/0332855 A1 Dec. 30, 2010

(51) Int. Cl.
*G06F 9/00* (2006.01)

(52) U.S. Cl.
USPC .................... 713/1; 713/2; 713/100; 713/300; 370/254; 709/220; 709/221; 709/222; 710/10

(58) Field of Classification Search
USPC . 713/1, 2, 100, 300; 370/254; 709/220–222; 710/10
See application file for complete search history.

(56) References Cited

U.S. PATENT DOCUMENTS 6,145,052 A * 11/2000 Howe et al. .................... 711/112
2007/0266387 A1 11/2007 Henmi
2008/0095360 A1 4/2008 Vuillaume et al.
2008/0155255 A1* 6/2008 Ohira et al. .................... 713/160
2010/0011211 A1* 1/2010 Anemikos et al. ............ 713/168
2010/0011225 A1* 1/2010 Takayama ..................... 713/189

FOREIGN PATENT DOCUMENTS

WO WO 2005/045683 5/2005
WO WO 2008/070053 6/2008

OTHER PUBLICATIONS

Baldwin, B. et al., "BSAFE Cryptographic Security Components", RSA Security Inc., http://quimby.gnus.org/internet-drafts/draft-baldwin-bsafe-00.txt, May 1999, retrieved Nov. 3, 2008, pp. 1-150.
Gray, J. et al., "Transaction Processing: Concepts and Techniques", 1993, Morgan Kaufmann Publishers, Inc., pp. 5, 210-221.
International Organization for Standardization, "Information technology—Identification cards—Integrated circuit(s) cards with contacts—Part 3: Electronic signals and transmission protocols", second edition, Dec. 15, 1997, pp. 1-27.
Sun Microsystems, Inc., "Application Programming Interface, Java Card™ Platform, Version 3.0, Classic Edition", Mar. 2008, pp. 1-411.
International Search Report and Written Opinion for PCT/US2009/006395, dated Apr. 7, 2010, 9 pages.

* cited by examiner

*Primary Examiner* — Christopher Brown
*Assistant Examiner* — Roderick Tolentino
(74) *Attorney, Agent, or Firm* — Brinks Hofer Gilson & Lione

(57) ABSTRACT

A method and memory device for implementing long operations and supporting multiple streams are provided. In one embodiment, a memory device receives data and a command from a host to perform an operation on the data, wherein a time required for the memory device to complete the operation exceeds a maximum response time for the memory device to respond to the command. The memory device begins performing the operation on the data and, before exceeding the maximum response time and before completing the operation, sends the context of the operation to the host. At a later time, the memory device receives from the host: (i) a command to resume performing the operation and (ii) the context. The memory device then resumes performing the operation on the data based on the context received from the host.

32 Claims, 6 Drawing Sheets

METHOD AND MEMORY DEVICE FOR PERFORMING AN OPERATION ON DATA

BACKGROUND

A memory device, such as a smart card or an SD card, can be used as an embedded secure module in a host, such as a personal computer (PC) or a mobile phone, to simultaneously support multiple tasks and application streams from the host. Access to the secure module is often asynchronous because applications running on the host are often not synchronized and because a secure module may only be able to execute a single operation at any moment in time. As a result, multiple applications on a host may need to time-share the secure module. As shown in FIG. 5, data from two or more different applications are divided into multiple blocks and are stored in two or more data buffers until the blocks can be processed by the secure module. In applications such as security processing (e.g., digital signature and encryption generation), blocks of data cannot be processed separately, as the processing of a given block depends on previously-processed blocks. Therefore, when processing two concurrent streams, the current context is saved in the secure module and later used for processing subsequent blocks. However, saving the context in the secure module can consume a relatively-large amount of memory, which can be a problem for memory devices, such as smart cards and SD cards, that have limited memory space. When used as secure modules, such storage devices may further require a special state management block, which can significantly increase the price of the secure module. Also, the performance of the secure module can significantly decrease because repeatedly writing the context to non-volatile memory can take a relatively-long time and decrease the life cycle of the non-volatile memory.

Another difficulty encountered with security processing in secure modules is that the time needed to complete a security operation (e.g., RSA key generation or RSA signature) can be longer than a maximum response time for the memory device to respond to the command. Smart cards deal with this situation by using a special "not ready" command (such as a "NULL" procedure byte defined in ISO-7816-3) to instruct the host to keep waiting (see FIG. 6). However, with this approach, the host may need to wait a relatively-long time until the operation is complete and may not be able to interrupt the operation. Additionally, there is a risk that the host driver could put the secure module in sleep mode during this time, which can result in the secure module's volatile memory being erased. Further, for some secure modules, such as SD cards, such special "not ready" commands cannot be implemented since they are not defined at the physical protocol level.

SUMMARY

Embodiments of the present invention are defined by the claims, and nothing in this section should be taken as a limitation on those claims.

By way of introduction, the embodiments described below are directed to a method and memory device for performing an operation on data. In one embodiment, a memory device receives data and a command from a host to perform an operation on the data, wherein a time required for the memory device to complete the operation exceeds a maximum response time for the memory device to respond to the command. The memory device begins performing the operation on the data and, before exceeding the maximum response time and before completing the operation, sends the context of the operation to the host. At a later time, the memory device receives from the host: (i) a command to resume performing the operation and (ii) the context. The memory device then resumes performing the operation on the data based on the context received from the host.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

The following embodiments provide a method and memory device for performing an operation on data. As noted above, some operations that a host asks a memory device to perform may take longer than the maximum response time given to the memory device to respond to the command. Some of the embodiments described below present a solution to this "long operations" problem that avoids the disadvantages encountered with prior solutions. Other embodiments described below can be used to support multiple applications without increasing cost and without decreasing security. The "long operations" embodiments and the "multiple streams" embodiments discussed below can be used alone or in combination with each other. Before turning to these embodiments, the following section discusses an exemplary memory device that can be used to implement either or both of these embodiments. It should be noted that other types of memory devices can be used.

Exemplary Memory Device

Figure 1:
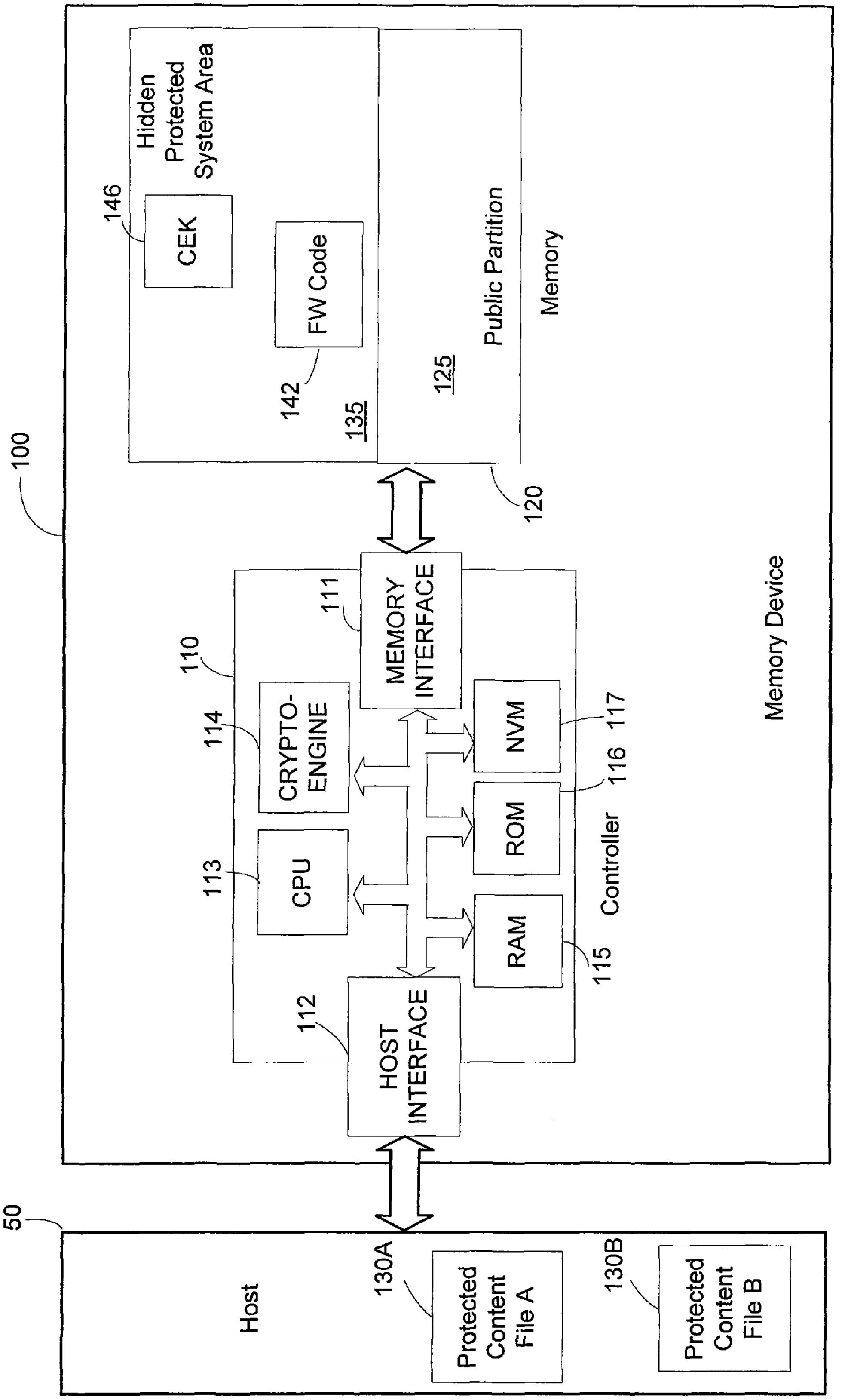
FIG. 1 is a block diagram of an exemplary memory device of an embodiment.

FIG. 1 is an illustration of an exemplary memory device 100 that can be used with these embodiments, although other types of memory devices can be used. In one embodiment, the memory device 100 takes the form of a handheld memory card that is removably connectable to a host, an embedded memory card (e.g., a secure module embedded in a host), a universal serial bus (USB) device, or a removable or non-removable hard drive, such as a solid-state drive. As shown in FIG. 1, the memory device 100 comprises a controller 110 and a memory 120. The controller 110 comprises a memory interface 111 for interfacing with the memory 120 and a host interface 112 for placing the memory device in communication with a host 50. As used herein, the phrase "in communication with" could mean directly in communication with or indirectly in communication with through one or more components, which may or may not be shown or described herein. For example, the host interface 150 can contain the physical and electrical connectors to send data and commands between the memory device 100 and the host 50. As also used herein, a host can take any suitable form, such as, but not limited to, a dedicated content player, a mobile phone, a personal computer, a game device, a personal digital assistant (PDA), a kiosk, a set-top box, or a TV system.

The controller 110 also comprises a central processing unit (CPU) 113, a crypto-engine 114 operative to provide encryption and/or decryption operations (the crypto-engine 114 can be implemented in hardware or software), read access memory (RAM) 115, read only memory (ROM) 116 which stores firmware for the basic operations of the memory device 100, and a non-volatile memory (NVM) 117 which stores a device-specific key used for encryption/decryption operations.

The memory 120 can take any suitable form. In one embodiment, the memory 120 is a mass storage device that takes the form of a solid-state (e.g., flash) memory and can be one-time programmable, few-time programmable, or many-time programmable. However, other forms of memory can be used. In this embodiment, the memory 120 comprises a public partition 125 that is managed by a file system on the host 50 and a hidden protected system area 135 that is internally managed by the controller 110. The hidden protected system area 135 stores firmware (FW) code 142 which is used by the controller 110 to control operation of the memory device 100, as well as a content encryption key (CEK) 146, which will be described below.

The public partition 125 and the hidden protected system area 135 can be part of the same memory unit or can be different memory units. The hidden protected system area 135 is "hidden" because it is internally managed by the controller 110 (and not by the host's controller) and is "protected" because objects stored in that area 135 are encrypted with the unique key stored in the non-volatile memory 117 of the controller 110. Accordingly, to access objects stored in that area 135, the controller 110 would use the crypto-engine 114 and the key stored in the non-volatile memory 117 to decrypt the encrypted objects. Preferably, the memory device 100 takes the form of a secure product from the family of products built on the TrustedFlash™ platform by SanDisk Corporation.

In this embodiment, protected content files 130A, 130B are stored in the host 50 and are protected by cryptography algorithms. For example, the content 130A, 130B can be encrypted and signed using key stored in the memory device 100 (e.g., in the controller's NVM 117 or in some other location).

The memory device 100 and host 50 can communicate with each other via a host interface 112. In one embodiment, for operations that involve the secure transfer of data, the crypto-engine 114 in the memory device 100 and the crypto-engine in the host 50 can be used to mutually authenticate each other and provide a key exchange (this is optional and not mandatory). The mutual authentication process calls for the host 50 and memory device 100 to exchange unique certification IDs. The host 50 and the memory device 100 can perform mutual authentication based on PKI. After mutual authentication is complete, it is preferred that a session key be used to establish a secure channel for communication between the memory device 150 and the host 50. It should be noted that single authentication can also be performed.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The controller 110 can also be implemented as part of the memory 120 control logic.

Example Methods for Performing an Operation on Data

After the host 50 sends a command to the memory device 100, the host 50 will expect the memory device 100 to respond to the command within a certain amount of time. Depending on the application, the maximum response time can range from a few hundred milliseconds to a few seconds, for example. If the memory device 100 does not respond to the command within the maximum response time allotted, the host 50 may assume that an error occurred. A problem occurs, however, when the memory device 100 is asked to perform an operation that takes longer than the maximum response time. For example, the time required for the memory device 100 to complete a security operation, such as an RSA key generation operation or an RSA signature operation, may exceeds a maximum response time for the memory device 100 to respond to the command. Smart cards deal with this situation by using a special "not ready" command to force the host 50 to give the smart card more time to complete the operation. However, a special "not ready" command may not be available to all memory devices because of protocol definitions. Further, even if a special "not ready" command is available, forcing the host 50 to wait until the operation is complete can lead to performance degradation and other issues, such as losing data during a power cycle or reset.

Figure 2:
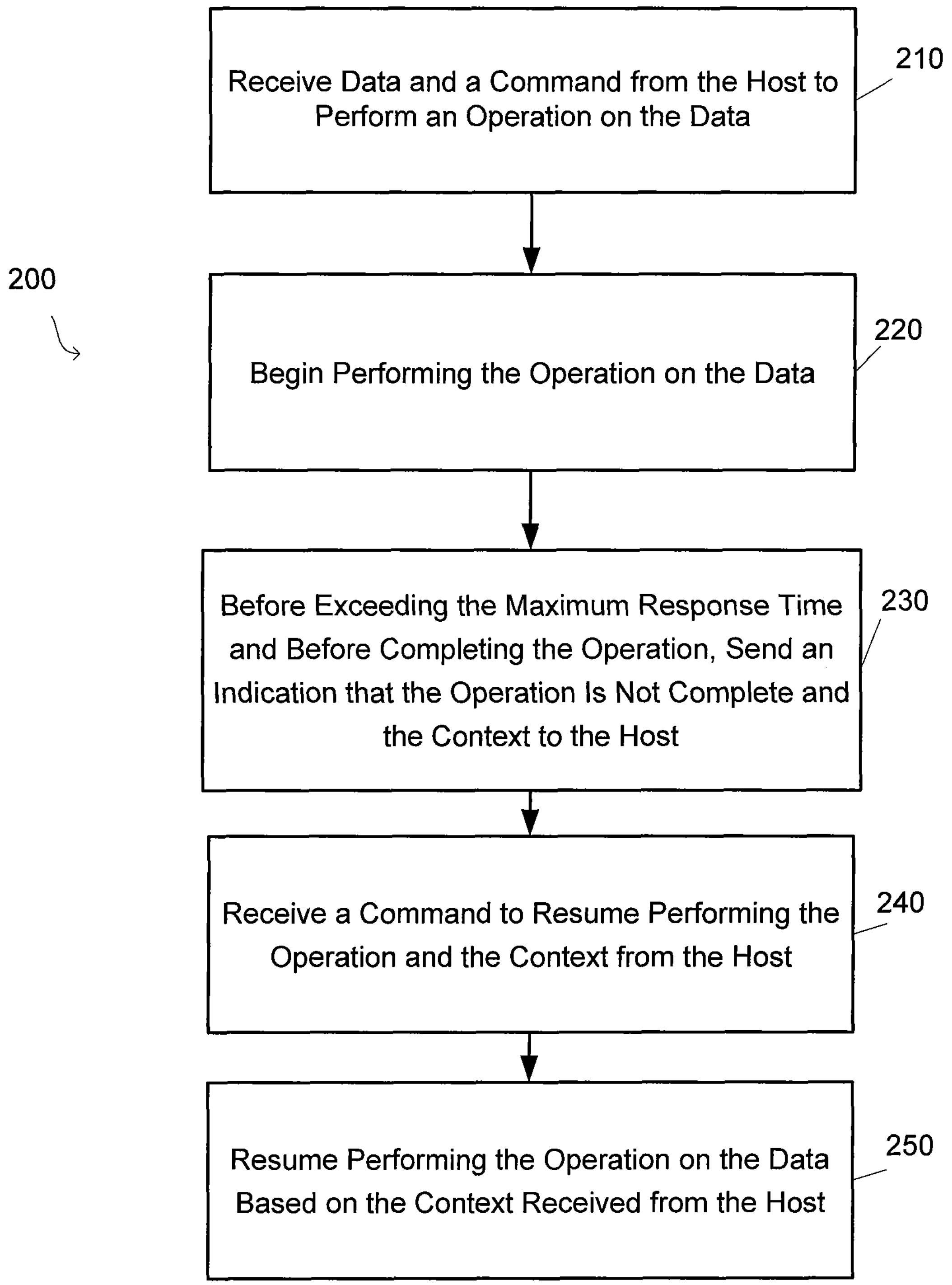
FIG. 2 is a flow chart of a method of an embodiment for performing an operation on data.

FIG. 2 is a flow chart 200 of a method of performing an operation on data in accordance with this embodiment and will be discussed in conjunction with the memory device 100 in FIG. 1 (although other types of memory devices can be used). As shown in FIG. 2, the memory device 100 receives data and a command from the host 50 to perform an operation on the data (act 210). In this example, the operation is a "long operation," meaning that the time required for the memory device 100 to complete the operation exceeds a maximum response time for the memory device 100 to respond to the command. This "long operation" can be, as mentioned before, a security operation, such as RSA key generation or RSA signature. Other types of operations, such as non-secure read and writing operations, operations to perform calculations on data, and operations to transmit and/or receive data over a wired or wireless network, can be performed. The memory device 100 then begins performing the operation on the data (act 220).

If the memory device 100 were to perform the operation to completion, the memory device 100 would exceed the maximum response time to respond to the command. So, in this embodiment, before exceeding the maximum response time and before completing the operation, the memory device 100 sends (i) an indication that the operation on the data is not complete and (ii) the context of the operation (act 230). In this way, the memory device 100 can be considered to have interrupted the operation and needs to resume the operation at a later time. The indication and context will now be discussed.

The indication that the operation on the data is not complete informs that host 50 that it will need to provide another command to the memory device 100 to continue the operation. This indication can take any suitable form, such as, for example, a flag in the normal response provided to the host 50. It should be noted that this indication is different from the special "not ready" command discussed in the background section above. The special "not ready" command forces the host to wait until the memory device has completed the long operation and needs to be pre-defined in the protocol used by the host and the memory device. In contrast, the indication provided to the host 50 in this embodiment merely informs the host 50 that it needs to send an additional command in order to instruct the memory device 100 to continue with the operation (e.g., a similar or identical command to the one previously issued to the memory device 100 that caused it to perform the operation in the first place) and can be provided using native send/receive (read/write) commands. (In some embodiments, both the "not ready" command and the indication can be used together.) Further, because this indication does not force the host 50 to wait for the memory device 100 to complete the operation, this embodiment gives the host 50 more control over executing operations on the memory device 100. That is, after receiving the indication, instead of sending another command to the memory device 100 to allow it to continue with the operation, the host 50 can send a different command to the memory device 100 for a different operation. In this way, the host 50 can interleave operations from other applications (i.e., handle "multiple streams"), as will be described in more detail below.

As mentioned above, in addition to providing the operation-not-complete indication, the memory device 100 also sends the current context of the operation to the host 50. As used herein, "context" includes the minimal set of data that is saved to allow the operation to be able to be continued after interruption. This minimal set of data can be, for example, the current execution state and/or the partial result of an operation. Many different types of operations and, accordingly, many different types of context can be used. For example, the operation can be a cryptographic operation, and the memory device 100 can generate a secret key for use in the cryptographic operation. Examples of cryptographic operations included, but are not limited to, an AES operation, a DES operation, an RC4 operation, an RSA operation, a DH operation, a DSS operation, an ECDH operation, an ECDSS operation, a MQV operation, a SHA1 operation, a SHA256 operation, a SHA384 operation, a SHA512 operation, an HMAC operation, a CBC-MAC operation, and a CMAC operation. If the cryptographic operation takes the form of an AES operation, a CBC-MAC operation, a CMAC operation, or a DES operation, the context can take the form of a current initial vector. Likewise, if the cryptographic operation takes the form of a SHA1 operation, a SHA256 operation, a SHA384 operation, a SHA512 operation, or a HMAC operation, the context can take the form of a current digest value. Additionally, if the cryptographic operation takes the form of a code block chaining ("CBC") operation, the context can take the form of a last encrypted block. As mentioned above, in addition to or instead of an encryption operation, other types of operations can be performed. For example, the operation can be an operation to read or write data in non-encrypted form, perform a calculation on data, or transit/receive data over a wired or wireless network.

As noted above, from the context, the memory device 100 can resume the operation from the point at which it left off. Accordingly, at a later time, when the host 50 sees fit, the host 50 would send the memory device 100 a command to resume performing the operation, along with the context previously provided to the host 50 by the memory device 100 (act 240), and the memory device 100 would resume performing the operation on the data based on the context received from the host 50 (act 250). If the memory device 100 can complete the operation within the maximum response time to respond to the command, the operation will be complete. However, if the memory device 100 still cannot complete the operation, acts 230, 240, and 250 are repeated as often as needed to complete the operation.

It should be noted that, in these embodiments, the context is stored in the host 50 and not in the memory device 100. (Alternatively, the context can be stored on yet another so-called proxy (e.g., another host/server/memory device).) Storing the context in the host 50 solves the problems discussed in the background section above. Specifically, storing the context in the host 50 instead of the memory device 100 avoids consuming a relatively-large amount of memory in the memory device 100, which can be particularly important for memory devices such as SD cards, which can have a restricted amount of memory. Also, storing the context in the host 50 avoids the need for (and expense of) a special state management block in the memory device 100. Further, by taking advantage of the host's resources (e.g., more RAM and stronger CPU), these embodiments avoid the negative impact on the memory device's performance and memory life cycle caused when the context is stored in the memory device 100.

There are many alternatives that can be used with these embodiments. For example, the memory device 100 can encrypt the context before providing the context to the host 50, thereby adding a level of security. The key used for such encryption can be a secret key stored in the memory device 100, as described above. The secret key can also be used to sign the context before providing the context to the host 50, thereby providing even additional security, as a digital signature based on a secret that is stored in the memory device 100 will allows detection of any change that may occur by mistake or as result of attack. Additionally, the memory device 100 can send operational information to the host 50 along with the context. The memory device 100 would receive this operational information back from the host 50 along with the context and can analyze the operational information to detect a fault or tampering of the context. Operation information can take any suitable form, such as, but not limited to, data length, identification of the algorithm that was used, the key size, and/or the session number.

Figure 3:
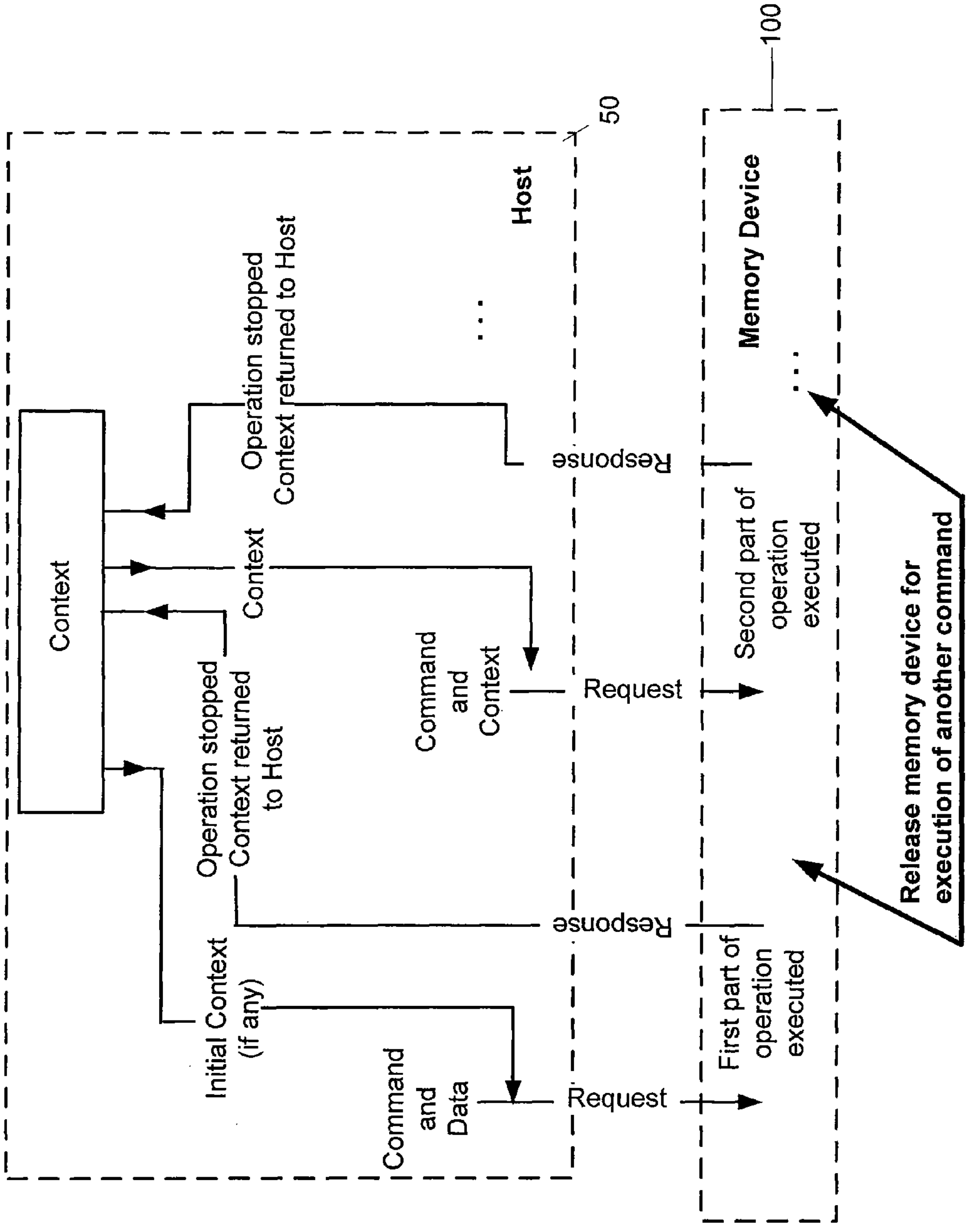
FIG. 3 is an illustration of the operations discussed in the flow chart of FIG. 2.

Also, as mentioned above, because the operation-not-finished indication provided by the memory device 100 does not force the host 50 to wait for the memory device 100 to be finished with the operation, this embodiment gives the host 50 more control over executing multiple operations on the memory device 100. This flexibility is illustrated in FIG. 3. Here, the host 50 provides data and the initial command to perform an operation to the memory device 100 (along with an initial context, if any). After the memory device 100 is done with the first part of the operation (i.e., the part of the operation that the memory device 100 can complete before exceeding the maximum response time), the memory device 100 returns the context to the host 100 for storage. As mentioned above, because the context is stored in the host 50 and not in the memory device 100, the memory device 100 does not suffer the performance and other issues described above when the context is stored in the memory device 100.

In this embodiment, when the memory device 100 sends the context to the host 50, it also sends an indication (e.g., a flag) to indicate that the host 50 needs to send an additional command to resume the operation at a later time. In response to this indication, the host sends a command to resume performing the operation, along with the previously-stored context, and the above-described process is repeated. The command to resume the operation can come immediately after the host 50 receives the indication. However, if the command to resume comes at a later time, the memory device 100 would be released to execute another command for another operation of the same or different application on the host 50. In this way, the host 50 can interleave commands from multiple applications between commands to perform the long operation. It should be noted that interleaving can take any suitable pattern. So, instead of alternating between commands from the first and second applications, the host 50 can provide two or more consecutive commands from one application before providing a command from another application.

In the above example, the memory device 100 was responsible for providing the host 50 with an indication that the host 50 needs to send an additional command to complete the operation. The controller 110 in the memory device 100 can know what the maximum response time is and can ensure that the response and the operation-not-complete indication is provided to the host 50 in time. Alternatively, the buffer of the memory device 100 can be designed such that the buffer can only store enough data that can be processed within the maximum response time. Nevertheless, the memory device 100 would still be responsible for determining whether the operation-not-complete indication should be provided to the host 50, as it is the memory device 100—not the host 50—in this embodiment that knows whether the operation needs to be continued.

Figure 4:
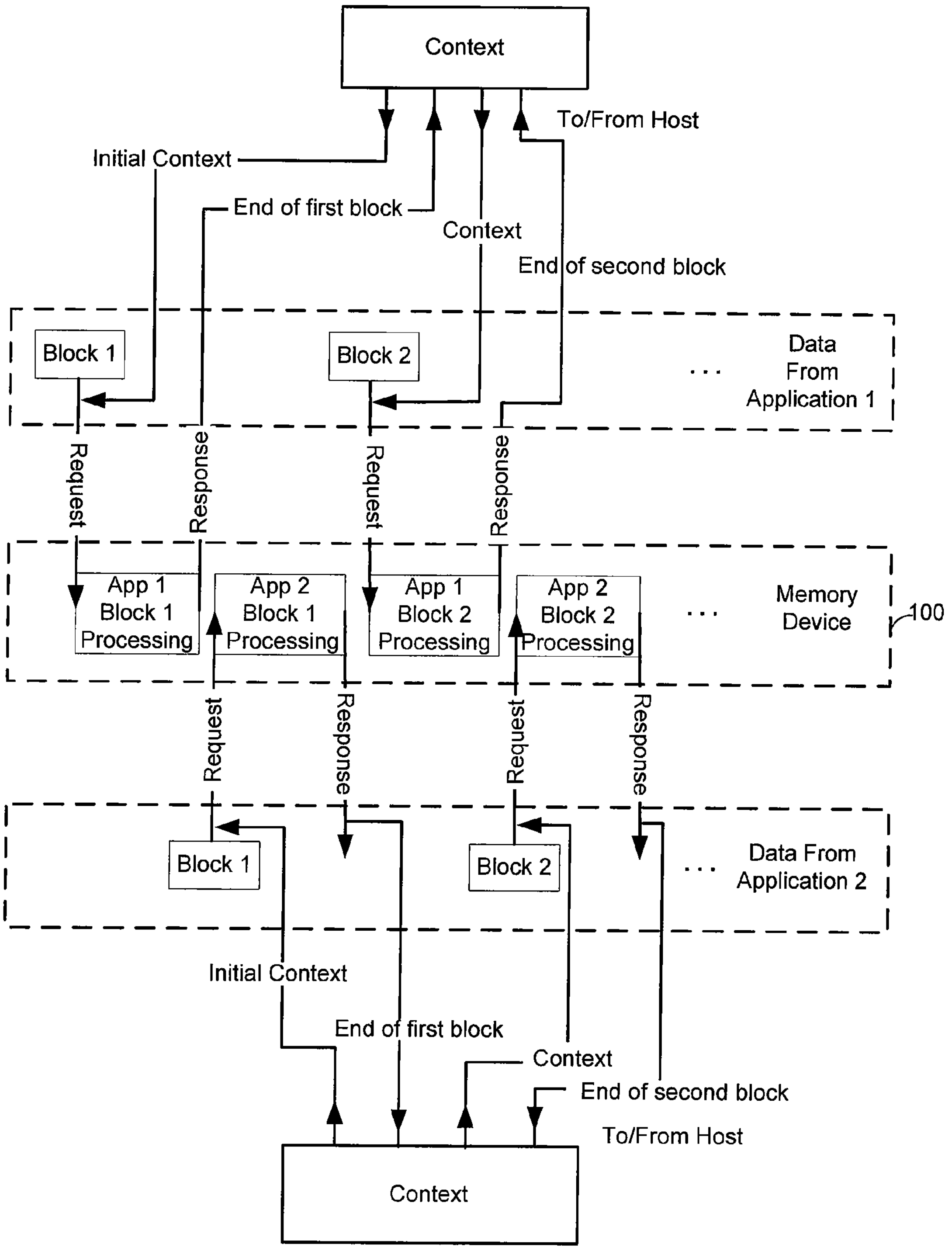
FIG. 4 is an illustration of handling multiple streams of an embodiment.
Figure 5:
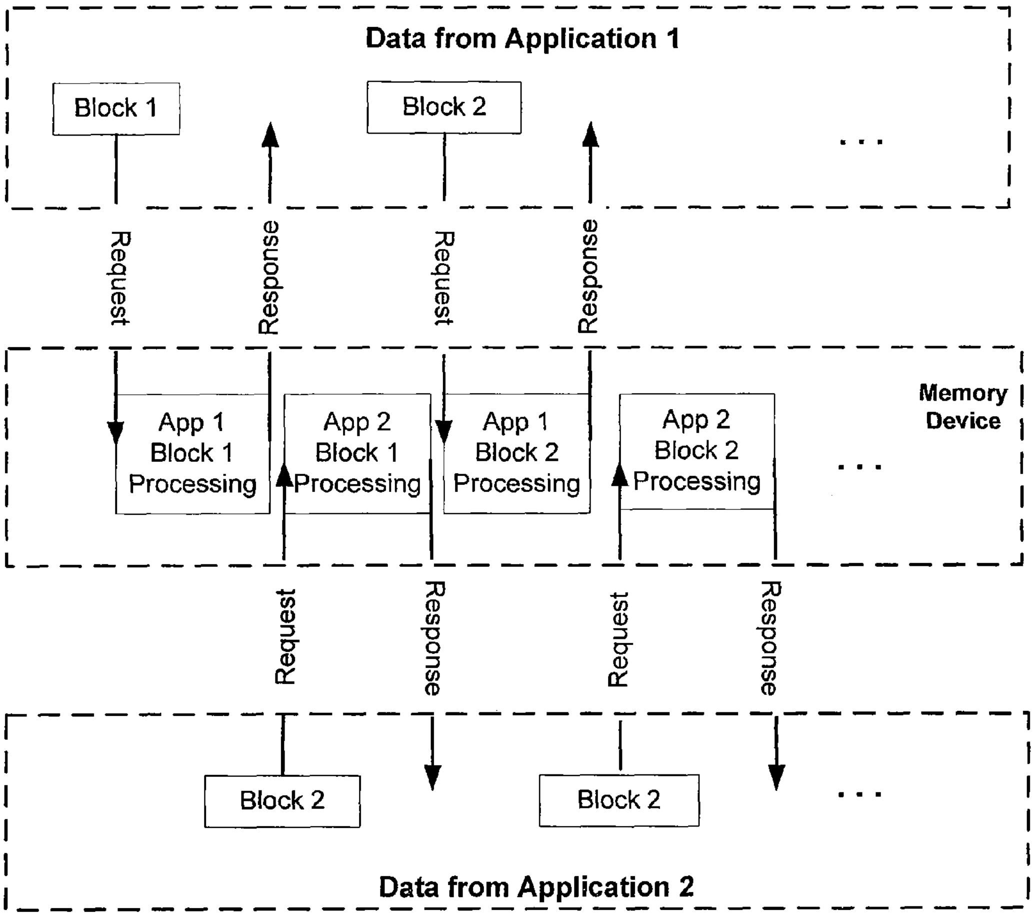
FIGS. 5 and 6 are illustrations of prior art methods of performing an operation on data.
Figure 6:
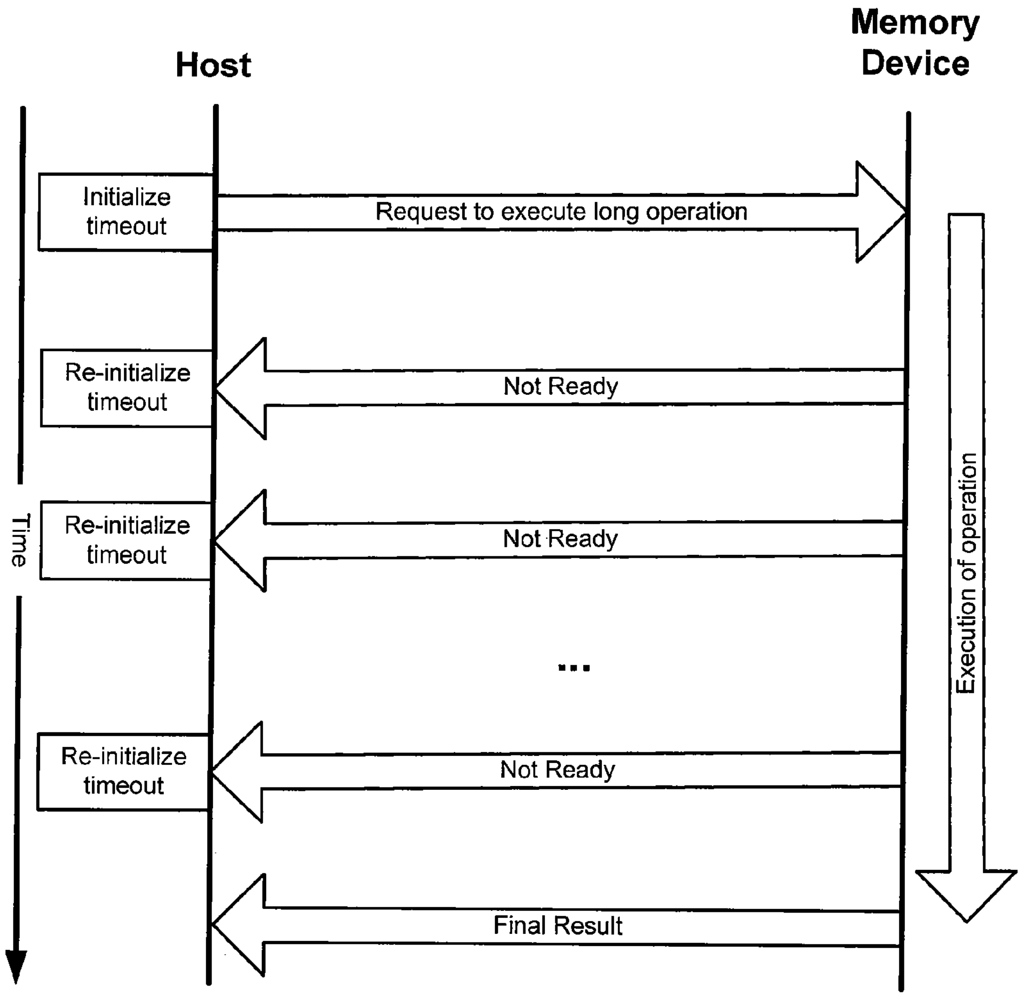

In an alternate embodiment, instead of the memory device 100 being responsible for informing the host 50 that it needs to send an additional command to continue the operation, the host 50 can take this responsibility. Accordingly, in this alternative embodiment, the memory device 100 does not need to provide the host 50 with an operation-not-complete indication because the host 50 is tracking if and when the operation is complete. This alternative provides similar advantages of interleaving commands from different applications and operations. As illustrated in FIG. 4, the host 50 provides data and the initial command to perform an operation to the memory device 100 (along with an initial context, if any). In this embodiment, the host 50 arranges the data to be processed in a series of blocks, with each block containing no more data than can be processed within the maximum response time of the memory device 100. After the memory device 100 is done processing the first block of data from this first application, it returns the context of the operation to the host 100 for storage. (As mentioned above, because the context is stored in the host 50 and not the memory device 100 in this embodiment, the memory device 100 does not suffer the performance and other issues described above when the context is stored in the memory device 100.) Since the host 50 organizes the data into blocks, it knows if an additional command is needed to complete the operation if there are additional blocks that need processing. So, the memory device 100 does not need to send an operation-not-complete indication to the host 50, as in the previously-described embodiment.

When the memory device 100 is done processing the first block from the first application, the host 50 can send the memory device 100 another command. In the example shown in FIG. 4, the host 50 sends the memory device 100 a command from a second application to process a first block of data from that second application. The above-described process is then applied to that block of data, and the memory device 100 is released to perform another operation (here, a command from the first application to process a second block of data). In this way, the host 50 can interleave commands to support multiple streams from multiple applications. (Breaking down a transaction into multiple blocks also protects against a system crash.) It should be noted that interleaving can take any suitable pattern. So, instead of alternating between the first and second applications as shown in FIG. 4, the host 50 can provide two or more consecutive commands from one application before providing a command from another application. Also, while the first and second applications are initialized by the same host 50 in this example, in other embodiments, the applications are initialized by different hosts (e.g., when both hosts have the same encryption and signature keys).

As shown by the illustration in FIG. 4, the context of the operation is returned to the application on the host 50, and the process of storing the context is handled by the application. Storing the context on the host 50 not only eliminates the requirement of additional RAM memory and internal non-volatile memory in the memory device 100, but it also eliminates the requirement for management firmware in the memory device 100, as every application will handle the context for its own stream(s). Additionally, the application does not need to understand what the context includes. It is just needs to store the context and provide it together with next command.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for performing an operation on data by a memory device, the method comprising:
- performing by a memory device in communication with a host:
  - receiving data and a command from the host to perform an operation on the data, wherein a time required for the memory device to complete the operation exceeds a maximum response time for the memory device to respond to the command;
  - beginning to perform the operation on the data in response to the command;
  - before exceeding the maximum response time and before completing the operation, sending a context of the operation to the host, wherein the context contains a set of data that allows the operation to later resume from where it left off; and
  - at a later time:
    - receiving from the host: (i) a command to resume performing the operation and, additionally, (ii) the context previously sent to the host; and
    - resuming performing the operation on the data based on the context received from the host.

2. The method of claim 1 further comprising beginning to perform a second operation on different data after sending the context to the host but before receiving the command to resume performing the operation from the host.

3. The method of claim 1 further comprising sending the host an indication that the operation on the data is not complete.

4. The method of claim 1, wherein the memory device comprises an embedded secure module in the host.

5. The method of claim 1, wherein the memory device is removable from the host.

6. The method of claim 1, wherein the operation comprises a cryptographic operation.

7. The method of claim 6, wherein the cryptographic operation comprises one of the following: an AES operation, a DES operation, an RC4 operation, an RSA operation, a DH operation, a DSS operation, an ECDH operation, an ECDSS operation, a MQV operation, a SHA1 operation, a SHA256 operation, a SHA384 operation, a SHA512 operation, an HMAC operation, a CBC-MAC operation, and a CMAC operation.

8. The method of claim 6, wherein the cryptographic operation comprises one of the following: an AES operation, a CBC-MAC operation, a CMAC operation, and a DES operation, and wherein the context comprises a current initial vector used in the cryptographic operation.

9. The method of claim 6, wherein the cryptographic operation comprises one of the following: a SHA1 operation, a SHA256 operation, a SHA384 operation, a SHA512 operation, and a HMAC operation, and wherein the context comprises a current digest value used in the cryptographic operation.

10. The method of claim 6 further comprising generating a secret key for use in the cryptographic operation.

11. The method of claim 1, wherein the operation comprises a signature operation.

12. The method of claim 1 further comprising encrypting the context before providing the context to the host.

13. The method of claim 12, wherein a key used to encrypt the context is a secret key stored in the memory device.

14. The method of claim 1 further comprising signing the context with a secret key stored in the memory device before providing the context to the host.

15. The method of claim 1 further comprising:

sending operational information, along with the context, to the host; and at the later time:

receiving the operational information, along with the context, from the host; and analyzing the operational information received from the host to detect a fault or tampering of the context.

16. The method of claim 1, wherein the context comprises at least one of an execution state of the operation and a partial result of the operation.

17. A memory device comprising:

a memory; and a controller in communication with the memory and configured to:

receive data and a command from a host to perform an operation on the data, wherein a time required for the memory device to complete the operation exceeds a maximum response time for the memory device to respond to the command;

begin performing the operation on the data;

before exceeding the maximum response time and before completing the operation, send a context of the operation to the host, wherein the context contains a set of data that allows the operation to later resume from where it left off; and at a later time:

receive from the host: (i) a command to resume performing the operation and, additionally, (ii) the context previously sent to the host; and resume performing the operation on the data based on the context received from the host.

18. The memory device of claim 17, wherein the controller is further configured to begin performing a second operation on different data after sending the context to the host but before receiving the command to resume performing the operation from the host.

19. The memory device of claim 17, wherein the controller is further configured to send the host an indication that the operation on the data is not complete.

20. The memory device of claim 17, wherein the memory device comprises an embedded secure module in the host.

21. The memory device of claim 17, wherein the memory device is removable from the host.

22. The memory device of claim 17, wherein the operation comprises a cryptographic operation.

23. The memory device of claim 22, wherein the cryptographic operation comprises one of the following: an AES operation, a DES operation, an RC4 operation, an RSA operation, a DH operation, a DSS operation, an ECDH operation, an ECDSS operation, a MQV operation, a SHA1 operation, a SHA256 operation, a SHA384 operation, a SHA512 operation, an HMAC operation, a CBC-MAC operation, and a CMAC operation.

24. The memory device of claim 22, wherein the cryptographic operation comprises one of the following: an AES operation, a CBC-MAC operation, a CMAC operation, and a DES operation, and wherein the context comprises a current initial vector used in the cryptographic operation.

25. The memory device of claim 22, wherein the cryptographic operation comprises one of the following: a SHA1 operation, a SHA256 operation, a SHA384 operation, a SHA512 operation, and a HMAC operation, and wherein the context comprises a current digest value used in the cryptographic operation.

26. The memory device of claim 22, wherein the controller is further configured to generate a secret key for use in the cryptographic operation.

27. The memory device of claim 17, wherein the operation comprises a signature operation.

28. The memory device of claim 17, wherein the controller is further configured to encrypt the context before providing the context to the host.

29. The memory device of claim 28, wherein a key used to encrypt the context is a secret key stored in the memory device.

30. The memory device of claim 17, wherein the controller is further configured to sign the context with a secret key stored in the memory device before providing the context to the host.

31. The memory device of claim 17, wherein the controller is further configured to:

send operational information, along with the context, to the host; and at the later time:

receive the operational information, along with the context, from the host; and analyze the operational information received from the host to detect a fault or tampering of the context.

32. The memory device of claim 17, wherein the context comprises at least one of an execution state of the operation and a partial result of the operation.

* * * * *

UNITED STATES PATENT AND TRADEMARK OFFICE

CERTIFICATE OF CORRECTION

PATENT NO. : 8,516,232 B2
APPLICATION NO. : 12/495302
DATED : August 20, 2013
INVENTOR(S) : Dolgunov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this
Thirtieth Day of December, 2014

Michelle K. Lee
*Deputy Director of the United States Patent and Trademark Office*